Sept. 13, 1932.  F. W. LAKE  1,877,467
COMPUTING DYNAMOMETER AND STROKE METER WITH
MOTOR DRIVEN RECORDING MEANS
Filed Dec. 11, 1928  3 Sheets-Sheet 1
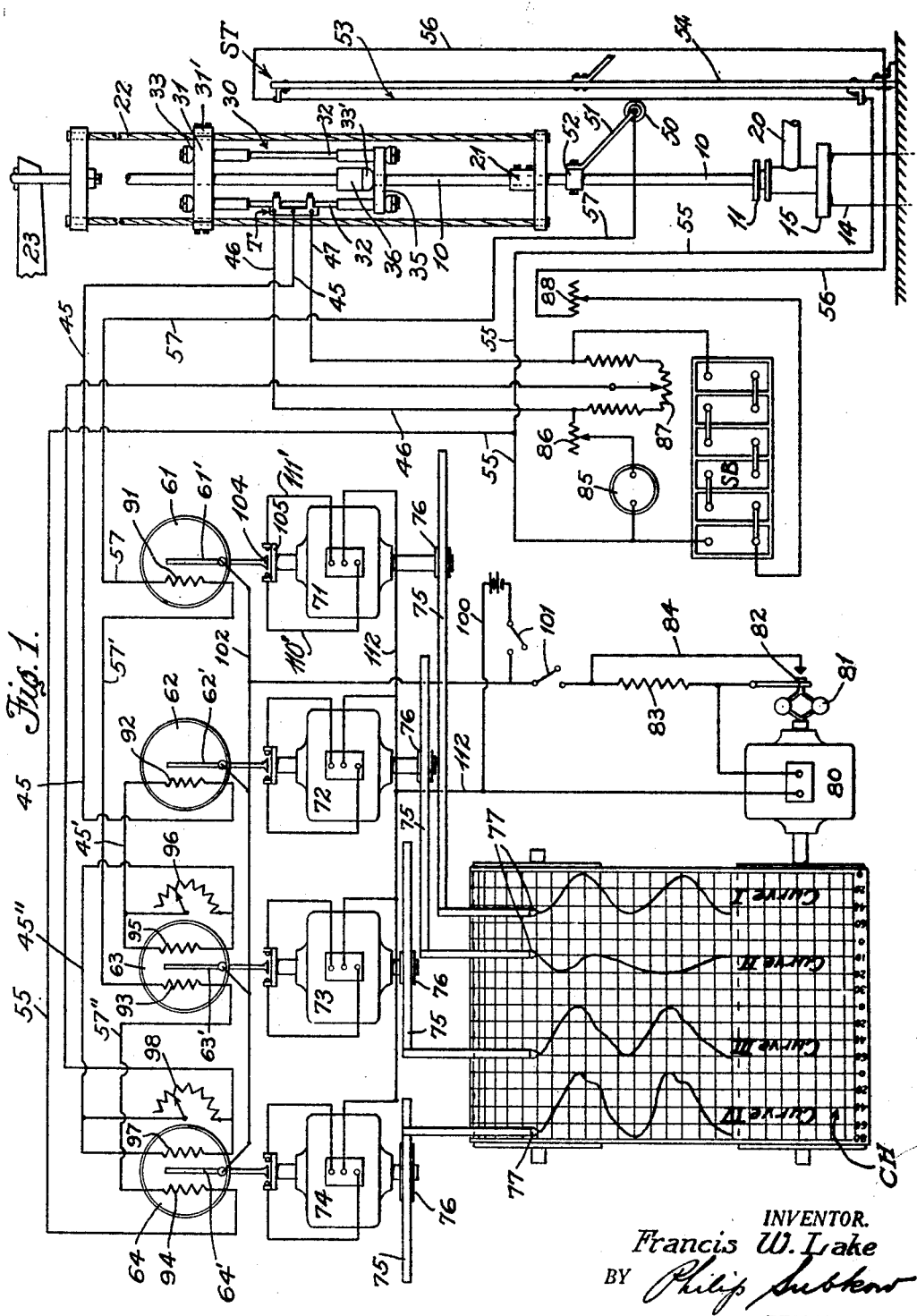
INVENTOR.
Francis W. Lake
BY Philip Subkow
ATTORNEY.

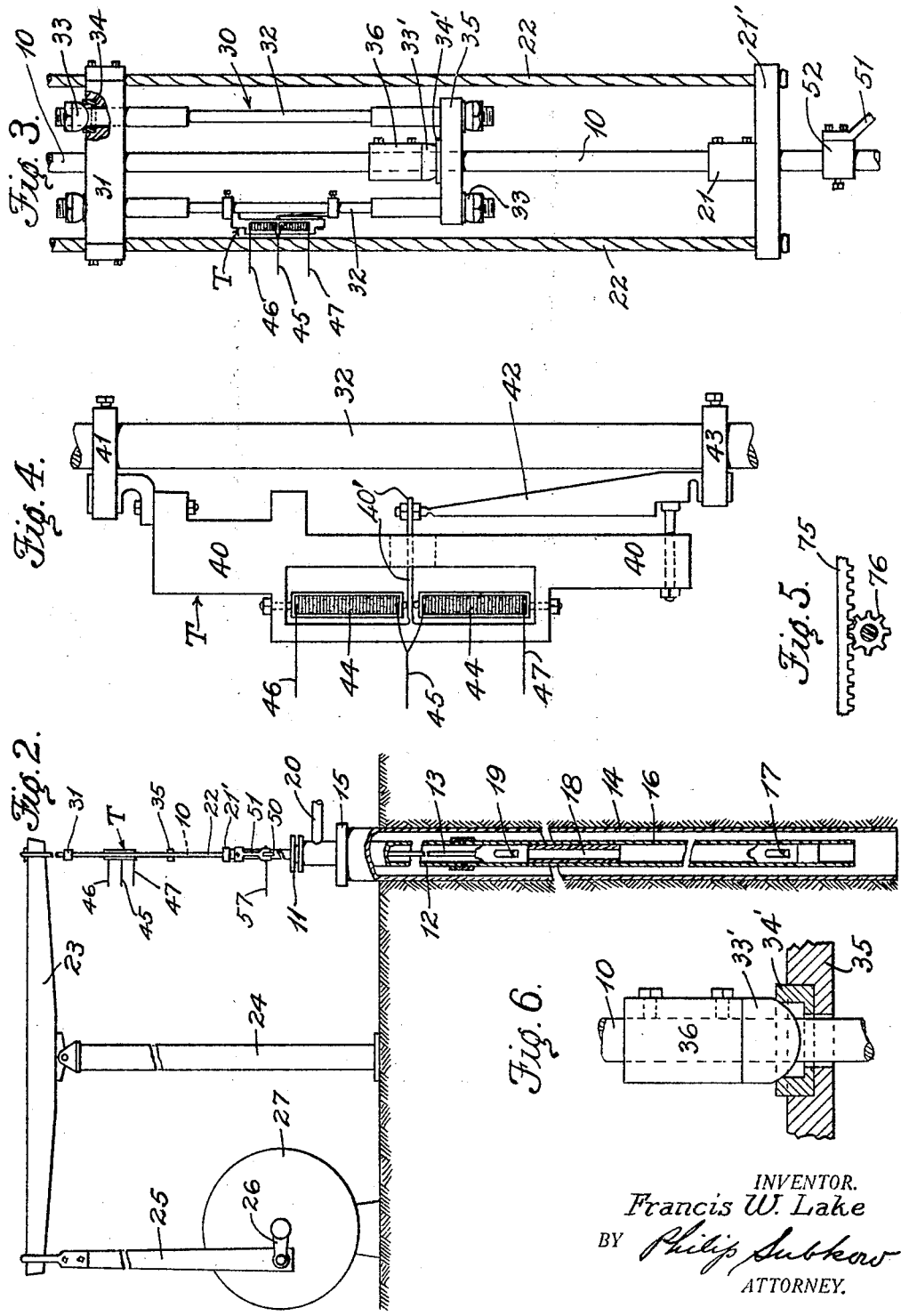

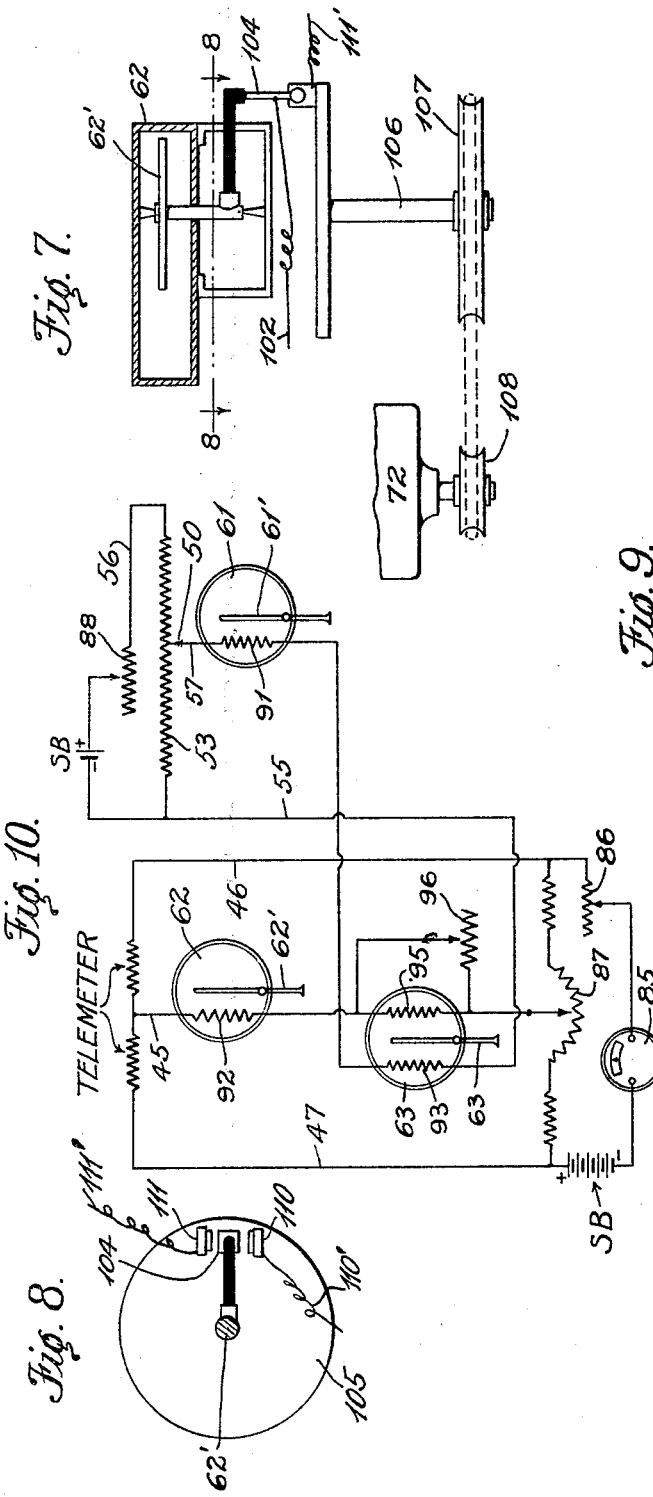

Patented Sept. 13, 1932

1,877,467

UNITED STATES PATENT OFFICE

FRANCIS W. LAKE, OF WHITTIER, CALIFORNIA, ASSIGNOR TO UNION OIL COMPANY OF CALIFORNIA, OF LOS ANGELES, CALIFORNIA, A CORPORATION OF CALIFORNIA

COMPUTING DYNAMOMETER AND STROKE METER WITH MOTOR DRIVEN RECORDING MEANS

Application filed December 11, 1928. Serial No. 325,140.

This invention relates to a process and apparatus for determining at one point the forces exerted upon an elastic member, loaded at a remote point, and undergoing variations in load and in position. The object is to determine at one point the work done by said movable member.

It is particularly directed to the determination of the work done by a pump piston, which pump piston is actuated by a long piston rod. More particularly, it is directed to the measurement of work done by a deep well pump of the reciprocatory variety wherein a plunger operated at great depth is reciprocated by an extremely long "sucker rod", perhaps a mile in length, the reciprocatory power being applied at the surface and the measurements of the work done by the plunger being recorded at the surface.

It is an object of this invention to obtain a true measurement of the relative motion of the plunger with respect to a fixed point at the surface and also with respect to the working barrel or plunger cylinder, measuring at the same time the variations in load on the plunger throughout its cycle of operation. By so measuring and recording the several variables, an actual record of the work and efficiency of the pump may be obtained. From this record the required changes in procedure and in pump elements necessary to obtain maximum efficiency can be determined.

In order to fully describe and illustrate my invention, a preliminary consideration of the forces exerted on the several parts of a well pumping apparatus will be helpful. It is well understood that the sucker rod stretches and that the amount of stretch is directly proportional to the load thereon, whether this load be merely weight of the rod itself or the rod weight plus oil load, plus friction, plus any other entering factors. The load represented by these combined influences is herein termed "the total load". In lifting such a loaded rod, it is necessary to apply a force sufficient to overcome said total load and start the rod with its plunger and its oil load. If I place a dynamometer between the "polished rod" or top sucker rod and the walking beam, or other rod-actuating means, I find that the load registered by the dynamometer in general builds up rapidly to its maximum during the first part of the up stroke, the registered load increasing until all retarding influences have been overcome; during the remainder of the upstroke the load shown by the dynamometer falls off gradually and during the down stroke continues to fall off since the oil load is released. This continues until the walking beam begins to slow up materially as the crank which operates the latter moves toward dead center, whereupon the load again begins to increase due to the momentum developed in the descending rods, the load increasing further as the up stroke commences and the cycle begins again. These changes in load represent changes in stretch in the rod. A similar but oppositely operating set of conditions develops in the pump tubing also, as more fully described hereinafter. Thus, the effective plunger movement is determinable only through consideration of all of the factors mentioned.

Therefore, it is also an object of this invention to measure and record the polished rod stroke, to measure and record the load variations, to determine and record the actual plunger movement, and to determine and record the movement of the plunger in relation to the working barrel on the pump tubing, that is to determine the effective plunger stroke. It is also an object to obtain all of these results and records automatically.

The invention generally speaking may be considered to reside in a method and apparatus for accomplishing these objects. I have found that a recording apparatus may be provided for recording upon a time-operated chart a curve representing the sucker rod stroke, and also that a recording dynamometer may be employed for recording upon said chart a second curve representing the load variations transmitted to the dynamometer, and that the actual plunger movement on the lower end of the sucker rod may be calculated from the data disclosed by the recorded curves when certain known constants regarding stretch are taken into consideration. I have found further that the relative movement of the plunger with respect to the working barrel can be calculated in a similar fashion from the data disclosed by the other curves. I have also discovered that by employing needle arms or the like to record the two curves mentioned, and by further employing one or more additional needle arms and providing suitable connections between the various needle arms or between the forces actuating the same, calculations of actual plunger movement and/or effective plunger movement may be automatically made and automatically inscribed upon said chart in the form of one or more additional curves, whereby curves representing all of these conditions will be automatically recorded on the chart. In a specific form these connections serve to add the relative movements of certain arms to those of other arms, or to subtract such movements, in order that the resultants may be described by the corresponding needles.

The invention therefore also includes means for measuring and recording the pump stroke on the chart, means for measuring and recording the total load changes, means operatively connected with the mentioned means for automatically calculating and recording actual plunger movements, and/or means operatively associated with the various other devices for automatically calculating and recording the effective plunger stroke, that is, the stroke of the plunger with relation to the working barrel. Preferably a time-controlled chart is employed in connection with the various recording devices in order that the records may be in the form of extended curves to represent as many cycles over corresponding time periods as required.

Obviously, only those curves finally desired need be actually recorded on the chart. Similarly, the computation and recording need extend only to the plunger movement, or to the effective plunger movement.

One embodiment of the invention is disclosed in the accompanying drawings for purposes of illustration, and comprises a variable resistance device S T for transmitting effects of the polished rod stroke, a telemeter T for transmitting effects of load changes, electro-sensitive devices such as ammeters or galvanometers or oscillographs, to control transmission of current effects to reversible motors respectively connected with such electro-sensitive devices, and recording means such as pens movable respectively by said motors transversely of a chart moving at constant speed whereby representative curves are recorded.

In the drawings

Fig. 1 indicates largely diagrammatically the measuring and recording devices and the resultant curves, together with the connections of the measuring devices with the means for receiving and transmitting load changes and the means S T for transmitting stroke effects;

Fig. 2 indicates the general relation to a deep well pump and actuating mechanism therefor;

Fig. 3 is a large-scale elevation of load carrying means employed for mounting the telemeter;

Fig. 4 is a large-scale elevation of a telemeter employed;

Fig. 5 is a detail of the drive connection between each motor and its rack;

Fig. 6 is a detail of bearings used in the load-carrying means of Fig. 3;

Fig. 7 is an elevational detail indicating the contact arrangements whereby the electro-sensitive devices serve to actuate and control the motors;

Fig. 8 is a similar detail taken from line 8—8 of Fig. 7;

Fig. 9 discloses a plurality of positions indicating a complete cycle of operation of an electro-sensitive devices and its motor; and Fig. 10 diagrammatically represents in compact form the telemeter or load circuit and the polished rod stroke circuit.

The drawings disclose the usual polished rod 10 of a deep well pump which rod passes through the stuffing box or packing gland 11 into the pump tube 12, the lower end of said polished rod being affixed to the upper end of the sucker rod string 13 in the usual fashion. The tube 12 depends within the well casing 14 through the casing head 15 and carries on its lower end the working barrel 16 having at the bottom a standing or foot valve 17 above which the pump plunger 18 reciprocates with its traveling valve 19 for the purpose of pumping an oil column up through the tubing 12 and discharging it through a flow pipe 20.

Reciprocation of the polished rod 10 during ordinary operation when no measuring means is attached, is accomplished through the medium of a polished rod clamp 21 secured to the rod and retaining a cross bar 21' to which is attached the reins 22 which extend upwardly to the walking beam 23 which rocks upon the Sampson post 24 and is actuated from a pitman 25 and a crank 26 on a band wheel 27 in turn actuated by any prime mover.

In order to connect a telemeter generally indicated at T for the purpose of measuring the load imposed upon the polished rod a calibrated telemeter support is provided which is generally indicated at 30 and is shown in detail in Fig. 4. This support comprises a cross head 31 to whose ends are bolted clamping pieces 31' for the purpose of binding said cross head upon the reins 22. A pair of calibrated rods 32 is carried by the cross head 31, these rods passing through openings in said cross head and being held upon the upper face thereof by means of anti-friction bearings such as hardened semi-ball bearings 33 capable of swinging in hardened particonical seats 34.

To the lower ends of the rods 32 a second cross member 35 is attached by means of other semi-ball bearings 33, and seats 34, this cross bar 35 receiving the polished rod 10 through a central aperture in line with a central aperture in the cross head 31 through which also said polished rod 10 projects. Upon the upper face of the cross bar 35 a semi-ball bearing 33' bears through a seat 34' like parts 33, 34, and immediately above this bearing there is located a second polished rod clamp 36. When the reins 22 are clamped to the cross head 31 by the binding members 31', and the polished rod clamp 36 is fixed upon the polished rod 10, and the polished rod clamp 21 is released, the load of the sucker rods will be transferred by way of the bearing 33' and cross bar 35 to the calibrated rods 32. The various semi-ball bearings insure uniform transmission of the load to the two rods 32 without any distortion in either rod. This mounting, therefore, insures transmission of the effects of exactly half of the sucker rod load to the telemeter T.

The telemeter T may be of known construction and in the present device is one developed by the U. S. Bureau of Standards. It consists of a body 40 secured to one of the rods 32 by a clamp 41 and a relatively movable member 42 secured to the same rod by a similar clamp 43. A slightly resilient arm 40' connected or integral with the member 40, is positioned to work between two compressible carbon piles 44 carried in the body 40, the inner end of each pile being supplied with an electric current through a line 45, while lines 46 and 47 lead respectively from the opposite ends of the upper and lower piles. As the calibrated rods 32 stretch and contract the carbon piles 44 are correspondingly compressed, thereby varying the resistance to the electric current proportionately with the load of the sucker rods, the strength of the current increasing through one pile as the load increases and increasing through the other pile as the load decreases. This device thus constitutes an electrcal telemeter.

For the purpose of measuring and indicating changes in the stroke movement, a mechanism generally indicated at ST is employed. It comprises a contact wheel 50 carried on a trolley 51 secured to the polished rod 10 by a clamp 52, said wheel being adapted to travel along a resistance wire 53 as the polished rod is reciprocated, said resistance wire 53 being mounted upon a support 54 on the derrick floor, and the opposite ends of said wire having leads 55 and 56 connected thereto and the contact roller 50 having lead 57 connected thereto.

An electric current to the load-measuring telemeter T and to the stroke-measuring devices ST is conveniently supplied by a storage battery SB. The variable currents passed by these measuring means are carried through suitably sensitive devices capable of operating needles or pens to record the measurements and resultants thereof in the form of curves upon chart CH. Such sensitive devices comprise voltmeters, ammeters or galvanometers which respond to the current changes, and reversible motors which actuate the pens and are controlled by said meters. As shown the current changes are indicated by electric meters 61, 62, 63 and 64, having respectively arms 61', 62', and 63' and 64' actuated by the currents and serving also to control respectively co-operating reversible motors 71, 72, 73 and 74, through means presently to be described, whereby suitable guide racks 75, driven by gears 76 on the motor shafts, are actuated to reciprocate corresponding recording pens 77 for the purpose of respectively recording upon the chart CH corresponding curves indicated as Curves I, II, III and IV. The chart CH is driven at a uniform speed by means of a motor 80 whose speed is controlled by a governor 81 operating a contact switch 82 which is opened when the speed increases beyond a certain value thereby cutting in a resistance 83 and cutting out the direct line 84, and is closed when the speed drops below said value so as to cut out said resistance. In this manner the operation of the motor is maintained uniform and the travel of the chart likewise is uniform.

The operation of the circuits is put under way by passing a current of suitable voltage (for example, 12 volts) from a storage battery SB to the telemeter T by way of a potentiometer or bridge balancing resistance connected with the leads 45, 46 and 47. This potentiometer comprises an ammeter 85, a variable resistance 86 for passing the desired current and a bridge circuit containing a variable resistance 87 for balancing the current through ammeter 85 so that the latter will read "0". The center lead 45 to the two carbon piles 44 runs to the meter 62 and through a winding 92 therein for the purpose of effecting movement of the respective meter arm 62'. As the calibrated rods 32 stretch and contract the carbon piles 44 are correspondingly compressed and released to vary the resistance thereof and thereby vary the quantity and direction of flow of current through the meter 62 and correspondingly cause movement of said arm 62'.

Thus, as the polished rod 10 is reciprocated any changes in load imparted to the calibrated rod 32 are transmitted through telemeter T to the meter 62 to occasion corresponding movement of its arm 62'.

The means ST for measuring the polished rod stroke has its leads 55 and 56 connected with the battery SB preferably to operate under a lower voltage (for example, 2 volts), and a variable resistance 88 is employed to determine such flow. The lead wire 57 from the contact roller 50 is connected with the meter 61 in order that the influences of the current flowing therethrough may actuate the meter arm 61' through winding 91 in meter 61 in proportion to the change in voltage due to the variable resistance developed as the contact roller 50 travels along the resistance wire 53 during the stroke of the polished rod.

Thus, the movement of the meter arm 61' is indicative of stroke movement by reason of changes in potential and such arm movement controls motor 71 to record Curve I on charge CH. And, as previously explained, the movement of the meter arm 62' is indicative of load changes as transmitted to the telemeter T, this arm movement controlling motor 72 to record Curve II.

Since, as previously explained, and also to be more fully set forth hereinafter, the plunger movement with respect to a fixed point can be determined by multiplying the load changes by a constant factor predetermined to be appropriate to each well condition, and algebraically adding such value to the stroke changes, such plunger movement may be indicated upon the chart CH as a third curve (Curve III). This may be accomplished by continuing the current from the stroke-measuring means ST through a winding 93 in the meter 63 by line 57' extending from the meter 61, and continuing the current from meter 62 by way of line 45' through the meter 63 by means of a winding 95 capable of multiplying the latter current effects a maximum number of times required for any well condition and employing in conjunction therewith a variable shunt 96 in the form of a suitable switch and resistance as shown in order to reduce to the necessary factor for the well being measured. Thus, the movement of the meter arm 63' will control the motor 73 to produce the Curve III which records the actual plunger movement with respect to a fixed point.

Similarly, since the plunger movement with respect to the working barrel at the lower end of the tubing may be computed by employing another constant factor, as previously explained and to be more fully explained, in which computation the effects of the load changes are multiplied by said factor and algebraically added to the stroke changes, a fourth meter 64 is employed in conjunction with a fourth motor 74, the stroke current from the meter 63 being conducted by a line 57" through a winding 94 in said meter 64 (and thence by lead 55 back to the battery SB), and the current from telemeter T leaving the meter 63 is conducted by line 45" through another multiplying winding 97 in said meter 64 which winding operates in conjunction with another variable shunt 98 in order that the effects of the stroke current and the multiplied effects of the telemeter current may operate upon the meter arm 64' to control the motor 74 which causes the corresponding Curve IV to be recorded on the chart CH.

If desired, the gear drive from the motors 73 and 74 may be varied in order to cut down the amount of wiring in windings 96 and 97, and such a variation in gear size is indicated in the gear 76 of motor 74. The shunt 98, however, is still required to vary the factors for different wells.

Thus, the four meters 61, 62, 63 and 64 in conjunction with the corresponding motors 71, 72, 73 and 74 and their respective pens, record respectively Curve I which indicates the polished rod stroke, Curve II which indicates load changes, Curve III which indicates plunger movement with respect to a fixed point, and Curve IV which indicates the effective plunger movement which is the movement of the plunger with respect to the working barrel and its standing valve.

For operating the motors 71, 72, 73 and 74 and the motor 80, a separate circuit indicated at 100 may be taken from any convenient service line such as a battery or a 110 volt line, and is provided with suitable switches 101 as indicated. One branch 102 of this circuit is connected with a contact finger 104 carried upon and actuated in each instance by means of the arm of the respective meter, such as the arm 62' of meter 62 which controls motor 72. The center of movement of each arm and its contact finger 104 is aligned with the axis of rotation of a disc 105 carried by a shaft 106 driven by a pulley 107 belted to a pulley 108 of reduced size carried by the armature shaft of the respective motor.

A pair of contacts on each disc 105 indicated as 110 and 111 respectively are connected with conductors 110' and 111' which respectively feed current for driving the respective motor in one direction or the other according to which contact is engaged by the contact finger 104, the circuit in each case being completed through the line 112, fed by the line 100.

The operation of the meter arms and the contact fingers 104 to control respective motors is diagrammatically indicated in Fig. 8, wherein Position A shows the respective meter arm 62' and finger 104 in netural position between the two contacts 110 and 111, the contact 110 being adapted to supply current to cause rotation to the right and contact 111 being adapted to reverse the current and cause rotation to the left. When current passing through the meter causes the arm 62' to carry the finger 104 into engagement with contact 111 as indicated in dotted lines the motor will be rotated in the direction of the arrow to bring the contacts 110, 111 into the dotted line position of Position B until the finger 104 is left in a neutral position as indicated by full lines in said Position B. If the meter arm is further actuated to the left, finger 104 will again engage the contact 111 and cause further rotation of the disc 105 to the left, as indicated at Position C. So long as the meter arm continues to move to the left this making and breaking of contact with consequent left movement of the motor and the disc will continue. However, when the current changes so as to cause movement of the meter arm to the right as indicated in Position D, said arm will bring the finger 104 into contact with the contact 110 to cause the motor to rotate the disc 105 to the right until said contacts 110 and 111 assume a neutral position with respect to the finger 104. Further movement of the arm to carry the finger 104 to the right will again produce contact with the contact 110 and cause further rotation to the right as in Positions E and F until the meter arm is caused to be moved again to the left as in Position G, whereupon the cycle will be repeated and the motor and the disc will again rotate to the left.

These movements are always small, but since the motors are of sufficiently high power to cause a rapid motion at each contact, a complete curve represented by a large number of contact movements is produced in a very few seconds. The operation of the chart-actuated motor 80 under the influence of the governor 81 is somewhat similar, the contact arm 82 being shifted from engagement with the terminal on the direct line 84 as rapidly as is necessary to continue a substantially constant flow of current through the motor by way of the line 84 or through the resistance 83 as may be required. As to the motor 80, it should be noted that any constant speed motor, e. g., a synchronous motor, may be employed in its stead.

In preparing for operation of the device, the crosshead 31 with rods 32 is clamped upon the reins 22, the telemeter T being mounted upon one of said rods 32, but the clamp 21 is left engaged and the clamp 37 is not tightened so as to leave rods 32 unloaded.

By adjustment of the variable resistance 87 the bridge circuit is balanced to show zero current passing through the electric meter 85. The clamp 36 is then secured to polished rod 10, clamp 21 is loosened, and pumping proceeds, thus throwing the changing loads upon rods 32. The desired amount of current passing through the resistance wire 53 is adjusted by resistance 88. As the calibrated rods 32 stretch with load increase, the resistance in one of the carbon piles 44 is increased while that in the other is decreased and the current is caused to flow through meter 62 in proportion to the load changes on the calibrated rods. Thus, the meter 62 will indicate the load changes upon the polished rod 10 during the pumping cycle. As the contact roller 50 travels along resistance wire 53 the resulting rise and fall in voltage will be indicated by meter 61.

The stroke current passed through meter 61 is also passed in series through the windings 93 and 94 in meters 63 and 64. The current flowing through the meter 62 is carried in series through winding 95 in the meter 63 in opposite direction to current flowing in winding 93, for reasons elsewhere explained. As previously described winding 95 is capable of multiplying the current effects the maximum number of times and the variable shunt 96 is employed to cut it down to the factor required for the particular conditions of the well being checked. This current after leaving the meter 63 is carried in series through a similar winding 97 and shunt 98 in the meter 64 which represent a different factor. The winding 95 in meter 63, as adjusted by shunt 96, represents the factor required to compute for the actual plunger stroke with respect to a fixed point, and the winding 97 in meter 64 as adjusted by shunt 98 represents the factor required to compute for the effective plunger movement with respect to the standing valve at the lower end of the working barrel.

In this manner the meter 61 operating through the motor 71 causes the Curve I to be recorded on the chart to indicate the polish rod stroke. Meter 62 working through motor 72 causes Curve II to be recorded to indicate the load variations on the polish rod. Meter 63 operating through motor 73 causes Curve III to be recorded to indicate the actual plunger stroke as a resultant of the polish rod stroke and the load changes on the polish rod, the necessary factor for the conversion being injected by means of the additional winding 95 and the variable shunt 96 in meter 63. Similarly the meter 64 working through motor 74 causes Curve IV to be recorded to indicate the effective plunger movement with respect to the standing valve as a resultant of the polish rod stroke and the load changes on the polish rod modified by another factor (heretofore explained) obtained through the additional winding 97 and the variable shunt 98 in the meter 64.

Before further describing the method of adjustment, the functions, and the operation of this device, it will perhaps be helpful to make some observations as to conditions desirable in measuring pump operations and to state certain considerations as to physical conditions existing in a deep well pump and as to physical forces imposed upon such pump. It is evident that measurement of the reciprocating motion of any part of the pump, whether it be the polished rod at the surface or the plunger within the working barrel, must be made with reference to some fixed point, which fixed point may be at the surface and may be taken as the bottom of the stroke of a point on the polished rod. Also the reciprocation of any such part should be measured as a function of time. The free motion of the polished rod if unloaded and perfectly counterbalanced, theoretically should be a sine curve representing as it does simple harmonic motion, and if the sucker rod and the tubing were rigid, inelastic members, the movement of the plunger with respect to the working barrel would be identical with the motion of the polished rod at the surface. However, there are several factors which act to cause departure of the recorded curve of the polished rod from said simple harmonic motion, among these factors being liquid load on the upstroke and not on the downstroke, friction, inertia, momentum, and the like. Also due to the fact that the rod usually is made of steel and therefore is not rigid but is elastic, the motion of the plunger is not identical with the movement of the polished rod at the surface. The variance between the plunger motion and the polished rod motion is a result of the stretch and contraction in the rod as caused by variations in the weight of the liquid load and variations due to friction, momentum, inertia, and rate of power application to the walking beam during various points of the working cycle of the plunger in the working barrel, all of which are recorded in the varying load on the polished rod. The amount of the rod stretch is directly proportional to the total load on the plunger as is well known and as previously pointed out.

The recorded Curves I and II representing respectively the motion of the polished rod and the variation in load upon the polished rod, show that when the sucker rod is reciprocated, the total load builds up rapidly to its maximum value during the first part of the upstroke, and after the parts are in full motion the load falls off gradually for the remainder of the upstroke. On the downstroke the load continues to fall off gradually until the rate of reciprocation of the walking beam begins to slow down materially when the crank pin which operates the walking beam closely approaches dead center whereupon the load begins again to crease due to the momentum developed by the descending sucker rod, said load increasing as dead center is approached and passed and continuing to increase as the next upstroke starts the cycle again. These load changes represent changes in stretch in the rod, and change in rod stretch may be calculated in direct proportion to the load change. By considering both the rod stretch and the polished rod movement, the plunger movement with respect to a fixed point is determinable.

There is also a stretch and contraction in the pump tubing which causes a limited reciprocation of the working barrel which is opposite in direction to the sucker rod stretch and contraction. This is due to the fact that when the polished rod moves upward tending to lift the plunger, the load on the standing valve at the bottom of the working barrel is transferred from said standing valve to the traveling valve, this load transfer tending to stretch the sucker rod and relieve the pump tubing which then contracts, that is, suffers a negative stretch. As the upward motion of the sucker rod progresses, the load on the traveling valve increases to the maximum as friction, inertia, and the like are being overcome and the maximum rod stretch takes place at the same time that the load relief on the standing valve results in the maximum contraction in the pump tubing.

Under these conditions, the upward travel of the plunger at the bottom of the sucker rod in any given time is less than the travel of the polished rod by the amount of the stretch of the sucker rod. When the plunger and its load get under way and friction and inertia have been overcome, a smaller amount of power is required to continue the motion and the load begins to decrease with the result that a contraction takes place in the sucker rod and the plunger tends to move upward an additional amount as measured by the decreasing stretch or contraction, the plunger movement being thereby accelerated in which case the total plunger movement upward is equal to the polished rod movement plus the amount of contraction or stretch decrease. Simultaneously as the sucker rod stretches due to the increasing load, the tubing contracts with the reduction in the load on the standing valve, and vice versa as the sucker rod contracts due to the decreasing load, the tubing stretches with the increasing load on the standing valve. Therefore, the upward plunger movement with respect to the working barrel is equal to the upward polished rod movement less the amount of sucker rod stretch and less the amount of tubing contraction, or plus the amount of sucker rod contraction and plus the amount of tubing stretch, according to conditions.

After the downstroke of the polished rod commences, downward movement of the plunger will commence as soon as sucker rod contraction becomes less than polished rod movement downward. The load on the polished rod on the downstroke gradually falls off and at the same time a corresponding amount of load is transferred to the standing valve which now carries the load previously on the traveling valve with the result that the pump tubing is stretched to an amount represented by the transferred load. During this load transfer, the downward movement of the plunger will be the movement of the polished rod less the contraction in the sucker rod, and the downward movement of the plunger with respect to the working barrel will be the downward movement of the polished rod less the contraction in the sucker rod and less the stretch in the tubing caused by the increasing load on the standing valve. Thus, since the increasing load on the tubing accompanies decreasing load on the sucker rod and vice versa, it will appear that the tubing stretches as the rod contracts and vice versa.

Obviously, if I calculate the plunger movement by adding or substracting (as conditions require) the amount of stretch or contraction in the sucker rod, I can in turn calculate the movement of the plunger with respect to the standing valve and thereby obtain the effective plunger travel, by adding or substracting (as conditions require) the stretch and contraction of the pump tubing.

The present device obtains these computations automatically and requires only to be adjusted in accordance with known conditions existing in the individual case being tested.

In order to more fully explain the principles underlying this device and to describe its adjustment to various conditions, a more complete mathematical analysis will be of assistance.

As stated before, the stretch of the sucker rod (and also of the pump tubing) is directly proportional to the total load and, in line with previous observations, we can also state that the relative motion of the plunger with respect to a fixed point or datum plane is equal to the motion of the polished rod plus or minus the change in total load calculated as stretch.

It is well known that the stretch of an elastic medium, such as a sucker rod or a tube up to its limit of elasticity, is computed by the following formula:

$$S = \frac{P \times 1000 \times L \times 12}{A \times E} \quad (1)$$

where

S = the stretch in inches
P = the load in thousands of pounds
L = the length in feet
A = the cross sectional area in square inches
E = the modules of elasticity of the material in pounds per square inch.

In calculating the stretch increment in the sucker rod, it is to be remembered that a positive increment in sucker rod stretch results in a negative increment of plunger movement and vice versa. Therefore, where $S_r$ = the increment of plunger movement resulting from the stretch increment in the sucker rod in inches
$P_r$ = the load increment on the polished rod in thousands of pounds and other symbols are as above, then:

$$S_r = \frac{-P_r \times 1000 \times L \times 12}{A \times E} \quad (2)$$

The polished rod load increment $P_r$ is measured at the surface by means of the telemeter 34, 35, 36, 38, 39, or by any other load or tension measuring device. Since we always know the modulus of elasticity E, the length of the sucker rod L, and the cross sectional area of the sucker rod A, we are always able to calculate the rod stretch. In making our calculations, the upward movement of the polished rod is measured in positive increments and the downward movement is measured in negative increments. Since an increase in polished rod load represents an increase in rod stretch and since an increase in rod stretch represents a relatively downward plunger movement, therefore a positive polished rod load increment represents a negative increment of plunger movement and vice versa, and a negative polished rod load increment represents a positive increment of plunger movement. The algebraic sum of the polished rod movement increment and the sucker rod stretch increment gives the plunger movement increment with respect to a fixed datum plane, the value being positive if the net movement is upward and negative if the net movement is downward, throughout all positions of the plunger cycle, it being understood that all increments are measured in a fixed time interval and thus exist simultaneously.

Similarly, in calculating the stretch increment in the tubing, it is to be remembered that positive increment of tubing stretch results in a negative increment of working barrel movement, therefore, where $S_t$ = the increment of working barrel movement resulting from the stretch increment in the tubing in inches,
$P_t$ = the load increment on the tubing in thousands of pounds and other symbols are as above Then:

$$S_t = \frac{-P_t \times 1000 \times L \times 12}{A \times E} \quad (3)$$

In calculating from Formula (3), an increase in tubing load represents an increase in tubing stretch and hence a relatively downward working barrel movement; therefore, a positive tubing load increment represents a negative increment of working barrel movement and vice versa, and a negative tubing load increment represents a positive increment of working barrel movement. The working barrel movement increment as calculated therefrom may be added algebraically in other computations and is positive if the working barrel movement is upward and negative if the working barrel movement is downward.

But, as I have demonstrated hereinbefore, a positive polished rod load increment is equal to the corresponding negative tubing load increment and vice versa, therefore $$P_r = -P_t \quad (4)$$

and Formula (3) becomes $$S_t = \frac{P_r \times 1000 \times L \times 12}{A \times E} \quad (5)$$

As above, the polished rod load increment $P_r$ is measured at the surface by means of the (telemeter 34, 35, 36, 38, 39), and since I always know the modulus of elasticity E, the length of the tubing to the working barrel L, and the cross sectional area of the tubing A, we are always able to calculate the tubing stretch. In accordance with Formula (5) and as hereinbefore demonstrated, a positive polished rod load increment represents a positive working barrel movement increment or an upward movement and vice versa, a negative polished rod load increment represents a negative working barrel movement increment or a downward movement.

Now to determine the plunger movement relative to a fixed point or datum plane, I calculate from the formula:

$$M_{pf} = M_r + S_r \quad (6)$$

Where:

$M_{pf}$ = Increment of plunger movement with respect to a fixed point, positive if upward, negative if downward.

$M_r$ = Increment of polished rod movement with respect to a fixed point, positive if upward, negative if downward.

$S_r$ = Increment of plunger movement resulting from stretch increment in the sucker rod from Formula 2, positive or upward when polished rod load increment is negative or decreasing; and negative or downward when polished rod load increment is positive or increasing.

And to determine further the plunger movement relative to the working barrel, we calculate from the formula:

$$M_{pw} = M_r + S_r - S_t \quad (7)$$

Where:

$M_{pw}$ = Increment of plunger movement with respect to the working barrel, positive if upward, negative if downward.

$M_r$ = Increment of polished rod movement with respect to a fixed point, positive if upward, negative, if downward.

$S_r$ = Increment of plunger movement resulting from stretch increment in the sucker rod from Formula 2, positive or upward when polished rod load increment is negative or decreasing; and negative or downward when polished rod load increment is positive or increasing.

$S_t$ = Increment of working barrel movement resulting from stretch increment in the tubing from Formula 5, positive or upward when polished rod load increment is positive or increasing, and negative or downward when polished rod load increment is negative or decreasing.

And by combining Formulæ (6) and (7):

$$M_{pw} = M_{pf} - S_t$$

To further illustrate the calculations and computations involved, the accompanying tables are presented to give a detailed example as determined from the curves illustrated in Fig. 3, for a well pumping at 5,000 feet through 2½ inch steel tubing with ¾ inch steel rods. It will be noted that the expression $$\frac{1000 \times L \times 12}{A \times E}$$

as found in each of Formulæ 2, 3 and 5, represents a constant value for any given pumping condition. Therefore, for 5,000 feet of ¾ inch steel rods (as given in the example) we find by substituting values in Formula 2, that:

$$S_r = -P_r \times 4.5$$

And for 5000 feet of 2½ inch steel tubing, by substituting values in Formula 3, we obtain $$S_t = -P_t \times 1.1$$

But, since $$P_r = -P_t$$

Therefore, $$S_t = P_r \times 1.1$$

(also obtainable from Formula 5).

Thus, the values 4.5 and 1.1 are the constants respectively represented in Formulæ 2, 3 and 5 for this example, and are the factors entering into the figures found in Columns (4) and (5) of the following tables.

| Time in seconds | Polished rod load thousands of pounds | Increment in polished rod load thousands of pounds | Increment in sucker rod stretch in inches | Increment in tubing stretch in inches | Total polished rod stroke with respect to a fixed point—inches | Increment in polished rod stroke with respect to a fixed point—inches | Increment in plunger stroke with respect to a fixed point—inches | Total plunger stroke with respect to a fixed point—inches | Increment in plunger stroke with respect to working barrel—inches | Total plunger stroke with respect to working barrel—inches |
|---|---|---|---|---|---|---|---|---|---|---|
| (1) | (2) | (3) | (4) | (5) | (6) | (7) | (8) | (9) | (10) | (11) |
| 1.00 | 10 | --- | --- | --- | 0 | --- | --- | 12.5 | --- | 18.0 |
| 1.25 | 11 | 1 | −4.5 | 1.1 | 2 | 2 | −2.5 | 10.0 | −3.6 | 14.4 |
| 1.50 | 15 | 4 | −18.0 | 4.4 | 10 | 8 | −10.0 | 0 | −14.4 | 0 |
| 1.75 | 13 | −2 | 9.0 | −2.2 | 21 | 11 | 20.0 | 20.0 | 22.2 | 22.2 |
| 2.00 | 12 | −1 | 4.5 | −1.1 | 32 | 11 | 15.5 | 35.5 | 16.6 | 38.8 |
| 2.25 | 10 | −2 | 9.0 | −2.2 | 40 | 8 | 17.0 | 52.5 | 19.2 | 58.0 |
| 2.50 | 8 | −2 | 9.0 | −2.2 | 42 | 2 | 11.0 | 63.5 | 13.2 | 71.2 |
| 2.75 | 7 | −1 | 4.5 | −1.1 | 40 | −2 | 2.5 | 66.0 | 3.6 | 74.8 |
| 3.00 | 5 | −2 | 9.0 | −2.2 | 32 | −8 | 1.0 | 67.0 | 3.2 | 78.0 |
| 3.25 | 5 | 0 | 0 | 0 | 21 | −11 | −11.0 | 56.0 | −11.0 | 67.0 |
| 3.50 | 5 | 0 | 0 | 0 | 10 | −11 | −11.0 | 45.0 | −11.0 | 56.0 |
| 3.75 | 5 | 0 | 0 | 0 | 2 | −8 | −8.0 | 37.0 | −8.0 | 48.0 |
| 4.00 | 10 | 5 | −22.5 | 5.5 | 0 | −2 | −24.5 | 12.5 | −30.0 | 18.0 |

The values in these columns have been obtained as follows:

Column (1)__from the chart.
Column (2)__from the chart. (Curve II).
Column (3)__from Column (2).
Column (4)__from Column (3) ×(−4.5).
Column (5)__from Column (3) ×(1.1).
Column (6)__from chart (Curve I).
Column (7)__from Column (6).
Column (8)__from Column (7) +Column (4).
Column (9)__from Column (8) (Curve III).
Column (10)__from Column (8) −Column (5).
Column (11)__from Column (9) (Curve IV).

In order to explain more particularly the operation of automatically calculating and recording the curves on chart CH in their relation to the preceding mathematical formulæ, consider the following:

Curve I which represents the polished rod stroke with respect to a fixed point, as inscribed on chart CH is developed as increments, positive and negative, per time interval directly proportional to the strength of the electric current flowing through the winding 91 in meter 61 from the stroke circuit 53, 55, 56, 57, which I will term Circuit I.

Curve II which represents the polished rod load, as inscribed on chart CH is developed as increments, positive and negative, per time interval directly proportional to the strength of the electric current flowing through the winding 92 in meter 62 from telemeter T and the other parts of the load circuit which we will term circuit II.

Curve III which represents the plunger stroke with respect to a fixed point, as inscribed on chart CH is developed as increments, positive and negative, per time interval directly proportional to the resultant effects (1st) of the electric current flowing through winding 93 which is the same as that flowing through winding 91 of Circuit I, and (2nd) of the effects of the electric current flowing through winding 95 which are the same as those of winding 92 of Circuit II multiplied by the proper constant. By Formula (6) to obtain the plunger stroke increment with respect to a fixed point, I must add to the polished rod stroke increment (positive or negative) the sucker rod stretch increment (positive or negative) which is equal to the negative value of the polished rod load increment (positive or negative) multiplied by a constant, which in the example is 4.5.

By referring to the electrical wiring it will be found that this is accomplished. In following the circuits, it should be noted first that the voltage in winding 91 drops as the polished rod moves on its downstroke by reason of the fact that the effective resistance of wire 53 increases as the contact roller 50 descends. It will also be noted that the load current through the winding 92 increases as the load increases due to the increased conductivity in the lower carbon stack 44. It will be remembered that, normally, when the polished rod moves on the downstroke the load decreases with the result that the sucker rod contracts, and that the plunger movement therefore is equal to the polished rod movement less the amount of contraction, and similarly in normal movement of the polished rod on the upstroke the load increases resulting in stretch of the sucker rod so that the actual plunger movement is equal to the polished rod movement less the amount of stretch. In order to accomplish the necessary subtraction the current from winding 91 of meter 61 is passed through winding 93 of meter 63 in one direction, and the current through winding 92 of meter 62 is passed through winding 95 of meter 63 in the opposite direction to the flow of the current through said winding 93, the effects of said current through winding 95 being multiplied by the proper factor by means of additional wraps and final adjustment through shunt 96 as required in any specific instance, said factor in the present example being 4.5. As the current is varied through Circuit I by the travel of contact roller 50 over resistance wire 53 of the stroke measuring means ST, such variations are carried through the winding 93, and tend to move the meter arm 63′, and the current variations in the telemeter T and Circuit II are passed through winding 95 and also tend to move the arm 63′, the resultant of these tendencies being represented by the actual movement of said arm 63′.

Curve III recorded by the movement of the motor 73 under influence of the arm 63′, thus represents the resultant of stroke and load changes indicated by the arm movement in the meter 63.

Otherwise stated, any movement increment (positive or negative) due to load change is algebraically deducted from any movement increment (positive or negative) due to stroke increment and the resultant of the actual increment in plunger movement in respect to a fixed point.

Stating these effects otherwise, to the polished rod stroke increment which is obtained by the strength of the electric current of Circuit I in windings 91 and 93, I add the negative value of the polished rod load increment which is obtained by the strength of the electric current of Circuit II in winding 92, multiplied in effect by the number of wraps of wire in winding 93 which is adjustable through shunt 96 to the desired degree, which in this example is 4.5 times the original effect in said winding 92.

However, in the well from which the curves shown on the chart were taken, the changes in load near the opposite ends of the stroke were so great that the rod stretch and contraction served actually to increase the plunger stroke, due to the fact that the load continued to build up to a high point after the bottom of the down stroke had been passed and the upstroke had been commenced, thus resulting in considerable stretch and continued downward movement of the plunger, and due also to the fact that after the top of the upstroke had been passed and the downstroke commenced the previously falling-off load continued to fall off so that contraction in the sucker rod continued to an extent sufficient to produce a continued upward plunger movement.

Curve IV which represents the plunger stroke with respect to the working barrel, as inscribed on chart CH is developed as increments, (positive and negative) per time interval, directly proportional to the resultant effects (1st) of the electric current flowing through winding 94 which is the same as that flowing through winding 91 of Circuit I, and (2nd) of the electric current flowing through winding 97 as varied by shunt 98, which is that flowing through winding 92 multiplied by the required factor. Now, by Formula (7), to obtain the plunger stroke increment with respect to the working barrel, I must add to the polished rod stroke increment (positive or negative) the sucker rod stretch increment (positive or negative) which is equal to the negative value of the polished rod load increment (positive or negative) multiplied by a constant (which in the example is 4.5) and subtract the tubing stretch increment which is equal to the positive value of the polished rod load increment multiplied by a constant (which in the example is 1.1); or, in effect, to the polished rod stroke increment, I add the negative value of the polished rod load increment multiplied by a constant which is equal to the sum of the two aforementioned constants, (which in the example is 5.6). By referring to the electrical wiring it is evident that this is acomplished, the operation being the same as that described in connection with the operation in meter 63 to obtain Curve III.

Or more particularly stated, to the polished rod stroke increment which is obtained by the strength of the electric current of Circuit I in the winding 94. I add the negative value of the polished rod load increment which is obtained by the strength of the electric current of Circuit II in winding 92, multiplied in effective strength by the number of coils of wire or wraps in winding 97 which is adjustable through shunt 98 to the desired degree, which in this example is 5.6 times the original effective strength in winding 92. If desired, a portion of this factor may be cared for by changing the ratio of the respective gear 76 through which motor 74 drives its rack 75 to cause the pen to form said Curve IV.

It is therefore evident that the mathematical calculations as hereinbefore completely described are automatically and accurately accomplished through the operation of the devices illustrated and elsewhere hereinbefore described, and that such calculations are automatically and accurately incorporated in Curves I, II, III and IV as inscribed on chart CH.

Having obtained the various time-space Curves I, II, III and IV, they will be studied by an experienced operator who will be able ordinarily to arrive at some conclusion as to the causes of the irregularities in the Curves III and IV and will therefore be able to modify pumping conditions or parts of the pumping equipment in order that a uniform curve of maximum amplitude may be approached as near as possible, such a curve being the result of optimum conditions and therefore being the curve which the operator is always anxious to obtain. For example, the humps in Curves III and IV as shown are probably due to a sticking plunger which can be easily remedied by replacement of plunger and working barrel.

Thus, specifically, by employing a polish-rod stroke-measuring device together with a dynamometer for measuring load variations of said rod, and then combining the effects of both devices, I may obtain results which constitute measurements of the actual plunger movement with respect to a fixed point and measurements of the effective plunger movement or the relation of the plunger movement to the standing valve.

Or, more broadly considered, if I measure at an available point the stroke and load of an elastic member loaded at a remote point, and combine such measurements while at the same time modifying them by known constants, I may obtain the actual movement or effective movement at the remote point.

It should be understood that these disclosures are merely illustrative of the generic invention, and that many modifications within the scope thereof may be made by those skilled in the art.

I claim:

1. A method for measuring stroke of a remote point of an elastic member, comprising measuring stroke of said member at a near point, measuring load variations imposed on said member at the near point, computing stretch changes caused by load variations, and combining stretch movements with stroke movement to obtain resultant movements.

2. A dynamometer comprising means for measuring at a proximate point the load imposed at such point upon an elastic member loaded at a remote point, means for measuring the movement of the elastic member at the proximate point, and means connected with said measuring means for computing the movement of said member at the remote point resulting from stretch and contraction due to load.

3. A dynamometer comprising means for measuring at a proximate point the load imposed upon an elastic member loaded at a remote point, means for measuring the movement of the elastic member at the proximate point, means for computing stretch in said member occasioned by the load thereon, and means actuable by the various means mentioned for recording the movement of the member at said remote point resulting from stretch due to the load.

4. A stroke meter comprising means for measuring at a proximate point the movement at said point of a moving elastic member loaded at a remote point, means for measuring at a proximate point the load imposed upon said member at such proximate point, and means connected with both of said measuring means for computing the movement of said member at the remote point resulting from movement at the proximate point and stretch and contraction due to load.

5. A stroke meter comprising means for measuring at a proximate point the movement at said point of a moving elastic member loaded at a remote point, means for measuring at a proximate point the load imposed upon said member at such proximate point, means for computing stretch in said member occasioned by the load thereon, and connections between the various means for recording the actual movement of the member at said remote point as a resultant of movement at the proximate point and stretch.

6. A stroke meter comprising means for measuring at a proximate point the movement at said point of a moving elastic member, loaded at a remote point and working in conjunction with a second elastic member loaded at said remote point, means for measuring at the proximate point the load imposed on the first elastic member at the proximate point, and means connected with both of said measuring means for computing the effective movement of the remote portion of the first member with respect to the remote portion of the second member as a resultant of movement at the proximate point and stretch and contraction of the two members due to load changes.

7. A meter for obtaining the resultant of two effects occurring in a single device, comprising electric means associated with said device for transmitting one of said effects, electric means for transmitting the other of said effects, electro-sensitive means actuable by both effects and indicative of the resultant thereof, a motor controlled by said electro-sensitive means, and indicating means actuated by the motor to indicate said resultant.

8. A stroke meter for a deep well pump comprising electric means to transmit stroke effects, electric means to transmit effects of load changes, and electro-sensitive means actuable by said effects to indicate stroke and load changes.

9. In combination a moving elastic member loaded at a remote point, a second elastic member in contact therewith at said remote point, means for measuring at a near point load changes imposed on the first member and means connected with said load measuring means for computing stretch in the second member.

10. An electric dynamometer for an elastic member undergoing elastic deformation and simultaneous motion, comprising a source of current, means for varying said current in correspondence to said motion, current responsive means, means for varying current to said last mentioned means in response to load variations, and an indicator movable under the influence of said current variations.

11. A dynamometer for a deep well pump having an elastic sucker rod comprising means for measuring load variations imposed on the top of the sucker rod, and means connected with said load measuring means for computing stretch caused in the sucker rod by said load.

12. A structure according to claim 11 including means to measure movement of the upper end of the rod, a chart and means for recording on said chart movement of the lower end of the sucker rod as affected by stretch.

13. A stroke meter for a deep well pump having an elastic sucker rod comprising means connected with the sucker rod for measuring movement at the top thereof, means connected with sucker rod for measuring load variations imposed on the top of the sucker rod, and means connected with both of said measuring means for computing movement of the bottom of said sucker rod.

14. A dynamometer for a deep well pump having an elastic sucker rod provided on its lower end with a plunger and means for reciprocating said rod, comprising means for measuring movement at the upper end of said rod, means for measuring variations in load imposed upon said rod, means for computing stretch variations in said rod as caused by load changes, and means for recording the plunger movement as a resultant of stretch variations in said rod and movement of said upper end.

15. In combination, a deep well pump having an elastic sucker rod, means for reciprocating said rod, means for measuring stroke of the upper end of said rod, means for measuring variations in load imposed upon said rod, and means associated with the load-measuring means for computing stretch variations in said rod.

16. In combination, a deep well pump having a reciprocating rod, electric means associated with said rod to transmit stroke effects, electric means to transmit effects of load changes on said rod, electro-sensitive means actuatable by the stroke effects, and electro-sensitive means actuatable by effects of the load changes to indicate said changes simultaneously with the indication of stroke changes.

17. In combination a deep well pump having a reciprocating rod, electric means associated with the rod to transmit stroke effects, electric means to transmit effects of load changes on the rod, and electro-sensitive means actuatable by both the stroke and load effects to obtain the resultant of the combined effects.

18. In combination, a deep well pump having a reciprocating rod, electric means associated with said rod to transmit stroke effects, electro-sensitive means actuatable by the stroke effects, a motor control by said electro-sensitive means, and an indicating device actuatable by the motor to indicate stroke effects.

19. In combination a deep well pump having a loaded reciprocating rod, electric means associated with the row to transmit effects of load changes on the rod, electro-sensitive means actuatable by the load effects, a motor controlled by said electro-sensitive means, and an indicating device actuatable by the motor to indicate effects of load changes.

20. A stroke meter for a deep well pump having a reciprocating pump rod, comprising electric means to transmit stroke effects, electric means to transmit effects of load changes, electro-sensitive means actuable by both said effects, a motor controlled by said sensitive means, and means actuated by said motor to indicate a composite of said effects.

21. A meter for a deep well pump having a loaded reciprocating rod, means for transmitting effects of rod movement, means for transmitting effects of load changes, means to multiply said load change effects, and means sensitive to both the effects of the rod movement and the multiplied effects of load change to indicate the resultant of rod movement and stretch.

22. A structure according to claim 21 wherein a motor is connected with and controlled by said sensitive means, and indicating means operated by the motor.

23. A meter for a reciprocating loaded member comprising a load sensitive device, an electric circuit connected with said load sensitive device, a second electric circuit connected to transmit effects of motion of the reciprocating member, and an electric meter connected with both of said circuits and actuable by the effects from both the load sensitive device and the reciprocation, and indicative of the resultant of the combined effects.

24. A meter for a reciprocating loaded member comprising a load sensitive device, an electric circuit connected with said load sensitive device, a second electric circuit connected to transmit effects of motion of the reciprocating member, and an electric meter connected with both of said circuits and actuable by the effects from both the load sensitive device and the reciprocation, indicative of the resultant of the combined effects, a motor responsive to the combined effects transmitted by the meter, and indicating means actuable by the motor.

25. A meter comprising a load sensitive resistance device, an electric circuit adapted to measure variations in resistance in said device, a second circuit adapted to measure variations in movements, a variable resistance in the second circuit, an electric meter responsive to the combined variations, a motor responsive to the effects of the combined variations as transmitted by the meter, and indicating means controlled by the motor.

26. In a recording device, a reversible motor, a disc movable with and actuated by said motor, a pair of contacts on said disc to pass current in opposite direction to said motor, a contact element movable between said pair of contacts to supply current to either of said pair, and means sensitive to influences to be recorded for moving said element in either direction between said contacts.

27. A meter comprising a load-sensitive device, and a reciprocating member, an electric circuit operatively connected to said load-sensitive device, an electric meter in said circuit, a second electric circuit, operatively connected to said reciprocating member, an electric meter in said second circuit, a plurality of motors controlled by said meters, one of said motors being responsive to the current effects in both of said circuits, a recording means actuated by said motors.

28. A meter comprising a load-sensitive resistance device, an electric circuit adapted to measuse variations in resistance in said device, an electric meter in said circuit, a second circuit, a variable resistance in said second circuit, an electric meter adapted to respond to variations in said resistance, electrical connections between said second circuit and said first mentioned meter to impart the effects of said variation in resistance to said first meter, a plurality of motors controlled by said meters, and a recording means operatively connected to said motors whereby the operations of said meters are recorded simultaneously.

29. A meter comprising a load-sensitive resistance device, an electric circuit adapted to measure variations in resistance in said device, an electric meter in said circuit, a second circuit, a variable resistance in said second circuit, an electric meter adapted to respond to variations in said resistance, electrical connections between said second circuit and said first mentioned meter, a plurality of motors controlled by said meters, and indicating means actuated by said motors.

30. A meter comprising a load-sensitive device, a reciprocating member, an electric circuit operatively connected to said load-sensitive device, an electric meter in said circuit, a second electric circuit operatively connected to said reciprocating member, an electric meter in said second circuit, a plurality of motors controlled by said meters, certain of said motors being responsive to current effects in both of said circuits, and indicating means actuated by said motors.

31. A meter comprising a load-sensitive resistance device, an electric bridge of which the said resistance device forms a part, a plurality of electric meters in series in said bridge adapted to measure the variations in resistance in said load-sensitive resistance device, certain of said meters having a plurality of coils, a reciprocating member, a variable resistance adapted to respond to reciprocation of said reciprocating member whereby the resistance is varied according to said reciprocation, an electric circuit of which said variable resistance forms a part, an electric meter in said circuit adapted to measure said variation in resistance, said last mentioned meter being in series with certain of the coils of certain of said plural wound meters in said first mentioned electrical bridge, electric motors operatively connected to said meters and adapted to move in synchronism with said meters, a plurality of recording devices operatively connected to said motors, a constant speed chart member for co-operating with said recording devices to record a curve thereon.

32. A dynamometer and stroke meter for a deep well pump having an elastic sucker rod provided at its lower end with a plunger, comprising means responsive to variations in movement imparted to the upper end of said rod, means responsive to variations in load imposed upon said rod, a movable recording member, a chart cooperating therewith, a connection between said movement responsive means and said recording means, a connection between said load responsive means and said recording means, and means for multiplying effects of said load responsive means, whereby the movement of said plunger is recorded as a resultant of stretch variations due to load changes and variations in movement at the upper end of said rod.

33. A dynamometer and stroke meter for a deep well pump having an elastic sucker rod provided at its lower end with a plunger, comprising means responsive to variations in movement imparted to the upper end of said rod, means responsive to variations in load imposed upon said rod, a movable recording member, a chart cooperating therewith, a connection between said movement responsive means and said recording means, and a connection between said load responsive means and said recording means, whereby the movement of said plunger is recorded as a resultant of stretch variations due to load changes and variations in movement at the upper end of said rod.

34. An electric dynamometer and stroke meter for a deep well pump having an elastic sucker rod provided at its lower end with a plunger, comprising a source of current, means for varying said current in correspondence to the motion of said rod, means for inducing current variations responsive to load variations imposed on said rod, a chart, recording means movable under the combined influence of said current variations for recording on said chart a curve indicative of the resultant of said rod movement and load variations.

35. An electric dynamometer and stroke meter for a deep well pump having an elastic sucker rod provided at its lower end with a plunger, comprising a source of current, means for varying said current in correspondence to the motion of said rod, means for inducing current variations responsive to load variations imposed on said rod, a chart, recording means movable under the combined influence of said current variations for recording on said chart a curve indicative of the resultant of said rod movement and load variations, and means for multiplying the effective movement of said recording means responsive to said load variations.

36. An electric dynamometer and stroke meter for a deep well pump having an elastic sucker rod provided at its lower end with a plunger, comprising a source of current, means for varying said current in correspondence to the motion of said rod, means for inducing current variations responsive to load variations imposed on said rod, a chart, recording means movable under the combined influence of said current variations for recording on said chart a curve indicative of the resultant of said rod movement and load variations, and means for multiplying the effective movement of said recording means responsive to said load variations, a second recording means, a current actuated means for moving said second recording means, means for varying said last mentioned current responsive to the stroke of said rod and responsive to the load on said rod and on the tubing, means for multiplying the effective movement of said recording means, and means for recording on said chart a curve indicative of the plunger movement with respect to the tubing as a resultant of variations in load and rod-stroke.

37. A meter for a deep well pump having an elastic pump tubing and an elastic sucker rod provided on its lower end with a plunger, said meter comprising means for measuring the load imposed upon the upper end of the suck rod, means connected with the load-measuring means for computing the stretch and contraction in said sucker rod, and means connected with said load-measuring means for computing the stretch and contraction in said tubing.

38. A construction according to claim 37 including means for measuring the stroke of the upper end of the sucker rod, and means connected with said stroke measuring means and both of said computing means for indicating the movement of said plunger with respect to a fixed point and the movement of said plunger with respect to the lower end of the tubing.

39. A stroke meter for a deep well pump having an elastic pump tubing and an elastic sucker rod provided on its lower end with a plunger, said stroke meter comprising means for measuring the stroke of the upper end of the sucker rod, means for measuring the load imposed upon said upper end, means for computing from load measurements the stretch and contraction in said sucker rod, means for similarly computing the stretch and contraction in said tubing.

40. In combination a deep well pump having an elastic pump tubing, an elastic sucker rod provided on its lower end with a plunger, means for reciprocating said rod, means for measuring the load imposed upon the upper end of said rod and means connected with said load measuring means for computing the stretch and contraction variations in said tubing.

41. In combination a deep well pump having an elastic pump tubing and an elastic sucker rod provided on its lower end with a plunger, means for reciprocating said rod, means for measuring the stroke of the upper end of said rod, means for measuring variations in load imposed upon said rod, means connected with said load measuring means for computing stretch variations in said tubing, and means for recording the effective movement of said plunger as a resultant of the rod stroke and the variations in tubing stretch.

42. A stroke meter for a deep well pump having an elastic pump tubing and an elastic sucker rod provided on its lower end with a plunger comprising means responsive to the stroke of the upper end of said rod, means responsive to variations in load imposed upon said rod, a recording member, a connection between said stroke responsive means and said recording member, means for multiplying effects of said load responsive means, a connection between said multiplying means and said recording member, whereby the movement of said plunger is recorded as a resultant of stroke movement of said rod and stretch variations due to load changes, a second recording member, a connection between said stroke responsive means and said second recording member, a second means for multiplying effects of said load responsive means, and a connection between said second multiplying and second recording means, whereby the movement of said plunger with respect to said tubing is recorded as a resultant of stretch variations and stroke of said rod.

43. In combination a deep well pump having a polished rod from which depends a sucker rod carried within a pump tubing, means for transmitting effects of polished rod movement as an electric impulse, means for transmitting effects of load changes on the polished rod as an electric impulse, and an electro-sensitive devices to receive effects of both the load changes and the polished rod movement and actuatable by the combined effects, such actuation being indicative of polished rod movement and stretch resultant.

44. A structure according to claim 43 together with means associated with the electro-sensitive device to multiply the impulses passed to said device under influence of load changes.

45. An electric dynamometer and stroke meter for a deep well pump having an elastic pump tubing and an elastic sucker rod provided on its lower end with a plunger, comprising electric means responsive to variations in stroke of the upper end of the rod by controlling the passage of a variable current corresponding to the variation in movement, electrical means responsive to variation in load imposed on said rod including means for controlling the passage of a variable current corresponding with the load variation, means for multiplying the effect of said current variations from said load-variation responsive means, a chart, recording means movable under the combined influence of the current variations from the stroke responsive means and from said multiplying means to record on said chart a curve indicating the movement of the plunger with respect to the tubing as a resultant of variations in load and rod-stroke.

46. An electric dynamometer and stroke meter for a deep well pump having an elastic pump tubing and an elastic sucker rod provided on its lower end with a plunger working in the tubing, comprising electric means responsive to variations in stroke of the upper end of the rod by passing a variable current in proportion to stroke variations, a chart, recording means movable under the influence of the electrical variations due to stroke for recording a curve upon said chart indicating stroke of the rod, electrical recording means responsive to load imposed upon said rod including means for controlling the passage of a variable current corresponding with load variations, recording means movable under the influence of the electric variations occasioned by the load variations for recording a curve on said chart indicating the load changes, means for multiplying the effect of current variations due to load variations, recording means movable under the combined influence of said current variations due to stroke changes and the said current variations due to load changes to record a curve upon said chart indicating the movement of the plunger as a resultant of rod stroke and load on the rod, a second means for multiplying the effect of current variations due to load changes in relation to combined tubing load and rod load, and recording means movable under combined influence of current variations due to stroke changes and said last mentioned current variations due to load changes to record a curve upon said chart indicating the effective movement of the plunger with respect to the tubing as a resultant of rod-stroke and load variations.

47. In combination a deep well pump having an elastic pump rod depending into an elastic pump tubing, means for transmitting rod movement in the form of electric effects, means for transmitting load changes on the rod in the form of electric effects, means to multiply the effect of load changes to represent change in rod stretch, an electro-sensitive device to receive said multiplied effects and the effects of rod movement and actuable by said combined effects, a second means to multiply the effects of lad changes to represent the resultant of rod and tubing stretch, a second electro-sensitive device to receive the combined effects of rod movement and the second multiplied effects of load change and actuable by the latter combined effects, and means for simultaneously indicating the results of the actuation of both of the electro-sensitive devices.

48. In combination a deep well pump having a polished rod from which depends a sucker rod contained within a pump tubing, means for transmitting effects of polished rod movement in the form of electric energy, means for transmitting effects of load changes on the polished rod in the form of electric energy, an electro-sensitive device actuated by the effects of the first mentioned means, a second electro-sensitive device actuated by the effects of the second mentioned means, a third electro-sensitive device containing means to receive effects of polished rod movement and containing means to receive and multiply effects of load changes whereby actuation of said third device is indicative of polished rod movement and stretch, and a plurality of motors respectively connected with and controlled by each of said sensitive devices for driving indicating means.

49. In combination a deep well pump having an elastic polished rod from which an elastic sucker rod depends into an elastic pump tubing, variable resistance means for transmitting polished rod movement in the form of electric effects, variable resistance means for transmitting load changes on the polished rod in the form of electric effects, electro-sensitive means actuated by the effects of rod movement, a second electro-sensitive means actuated by the effects of load changes, a third electro-sensitive means actuated by both effects and including means to multiply the effects of load to represent sucker rod stretch, a fourth electro-sensitive means actuated by both first mentioned effects and including means to multiply the load effects to represent the resultant of sucker rod and tubing stretch, a plurality of reversible electric motors respectively controlled by said electro-sensitive means, and recording elements driven by said motors.

50. In combination a deep well pump having a polished rod from which an elastic sucker rod depends into an elastic pump tubing containing a work barrel receiving the sucker rod plunger, means for transmitting effects of polished rod movement, a device sensitive to such effects, means for transmitting effects of load changes, a device sensitive to such effects of load changes, means to multiply said load change effects, a device sensitive to both the effects of polished rod movement and to said multiplied effects as a resultant of polished rod movement and stretch, and a plurality of reversible recording motors respectively controlled by said sensitive devices.

51. A stroke meter for a deep well pump having a polished rod, sucker rod and tubing, variable resistance mechanism to transmit effects of polished rod movement, a bridge and bridge-balancing resistance to transmit effects of load changes, electro-sensitive devices actuated by said effects, certain of said devices including means to multiply load change effects whereby the actuation of such certain of said devices represents the resultant of polished rod movement and stretch, and a motor controlled by certain of said devices to produce records representative of the actuation of the corresponding device.

52. In combination a deep well pump having a polished rod from which a sucker rod depends within a pump tubing having a working barrel, said rod carrying a plunger working in said barrel, means for transmitting effects of polished rod movement, means for transmitting effects of load changes on said polished rod, a device sensitive to one of said effects, means to multiply effects of load changes, a device sensitive to both the effects of polished rod movement and said multiplied effects whereby actuation of the second sensitive device is indicative of the resultant of polished rod movement and load changes, motors respectively controlled by said sensitive devices and indicating means actuated by said motors for indicating the corresponding effects in predetermined relation.

53. In combination a deep well pump having a polished rod from which a sucker rod depends within a pump tubing having a working barrel, said rod carrying a plunger working in said barrel, means for transmitting effects of polished rod movement, means for transmitting effects of load changes on said polished rod, a device sensitive to one of said effects, a device sensitive to both the effects of polished rod movement and load changes whereby actuation of the second sensitive device is indicative of the resultant of polished rod movement and load changes, motors respectively controlled by said sensitive devices and indicating means actuated by said motors for indicating the corresponding effects in predetermined relation.

Signed at Los Angeles, in the county of Los Angeles, and State of California, this 26th day of November A. D. 1928.

FRANCIS W. LAKE.